(12) United States Patent
Kim et al.

(10) Patent No.: US 11,274,183 B2
(45) Date of Patent: Mar. 15, 2022

(54) METHOD OF PREPARING POLYARYLENE SULFIDE

(71) Applicant: LG CHEM, LTD., Seoul (KR)

(72) Inventors: Hansol Kim, Daejeon (KR); Joong Jin Han, Daejeon (KR); Eunju Park, Daejeon (KR); Hyun Woog Ryu, Daejeon (KR); Kwonsu Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 84 days.

(21) Appl. No.: 16/491,132

(22) PCT Filed: Sep. 14, 2018

(86) PCT No.: PCT/KR2018/010862
§ 371 (c)(1),
(2) Date: Sep. 4, 2019

(87) PCT Pub. No.: WO2019/059593
PCT Pub. Date: Mar. 28, 2019

(65) Prior Publication Data
US 2019/0390016 A1 Dec. 26, 2019

(30) Foreign Application Priority Data

Sep. 20, 2017 (KR) .......... 10-2017-0121475
Sep. 11, 2018 (KR) .......... 10-2018-0108349

(51) Int. Cl.
C08G 75/0259 (2016.01)
C08G 75/0281 (2016.01)

(52) U.S. Cl.
CPC ..... *C08G 75/0259* (2013.01); *C08G 75/0281* (2013.01)

(58) Field of Classification Search
CPC ............... C08G 75/14; C08G 75/0263; C08G 75/0268; C08G 75/0259; C08G 75/025; C08G 75/0281
See application file for complete search history.

(56) References Cited

U.S. PATENT DOCUMENTS

| 4,794,161 | A |   | 12/1988 | Kato et al. |
|-----------|---|---|---------|-------------|
| 4,810,773 | A |   | 3/1989  | Ogata et al. |
| 4,845,190 | A |   | 7/1989  | Inoue et al. |
| 5,126,430 | A | * | 6/1992  | Senga ................ C08G 75/025 528/226 |

(Continued)

FOREIGN PATENT DOCUMENTS

| CN | 106459413 A | 2/2017 |
|----|-------------|--------|
| CN | 107108893 A | 8/2017 |

(Continued)

OTHER PUBLICATIONS

Office Action of Japanese Patent Office in Appl'n No. 2019-547479, dated Jun. 1, 2020.

*Primary Examiner* — Shane Fang
(74) *Attorney, Agent, or Firm* — Dentons US LLP

(57) ABSTRACT

According to the present invention, an alkali metal salt such as NaCl which is a major by-product of polyarylene sulfide polymerization may be recycled in the dehydration reaction for the preparation of a sulfur source, thereby providing a method of preparing a polyarylene sulfide with a high yield in an economical manner.

11 Claims, 1 Drawing Sheet

(56) References Cited

U.S. PATENT DOCUMENTS

| | | |
|---|---|---|
| 5,266,680 A | 11/1993 | Reed |
| 5,635,587 A | 6/1997 | Koyama et al. |
| 2010/0210813 A1 | 8/2010 | Foder et al. |
| 2011/0319587 A1 | 12/2011 | Hinokimori |
| 2014/0128568 A1 | 5/2014 | Hinokimori |
| 2015/0344632 A1 | 12/2015 | Chen et al. |
| 2016/0244612 A1* | 8/2016 | Unohara ............... C08L 23/02 |
| 2017/0130005 A1 | 5/2017 | Takechi et al. |
| 2017/0362387 A1 | 12/2017 | Konno et al. |

FOREIGN PATENT DOCUMENTS

| | | |
|---|---|---|
| EP | 0 215 312 A1 | 3/1987 |
| EP | 0 226 909 A2 | 7/1987 |
| EP | 0 302 218 A1 | 2/1989 |
| EP | 0 418 455 A2 | 3/1991 |
| EP | 0658587 A2 | 6/1995 |
| EP | 2940061 A1 | 11/2015 |
| EP | 3162839 A1 | 5/2017 |
| JP | 64-009229 A | 1/1989 |
| JP | 6-018877 B2 | 3/1994 |
| JP | 10-130005 A | 5/1998 |
| JP | 2003-212997 A | 7/2003 |
| JP | 2005-344045 A | 12/2005 |
| JP | 2007-269638 A | 10/2007 |
| JP | 2010-106179 A | 5/2010 |
| JP | 5125993 B2 | 1/2013 |
| JP | 2014-005409 A | 1/2014 |
| JP | 2014-024983 A | 2/2014 |
| KR | 10-1992-0011028 B1 | 12/1992 |
| KR | 10-2011-0086702 A | 7/2011 |
| KR | 10-2011-0118780 A | 11/2011 |
| KR | 10-1711182 B1 | 2/2017 |

* cited by examiner

[FIG. 1]
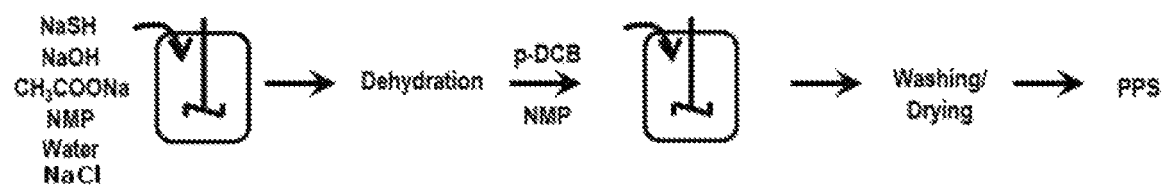
[FIG. 2]
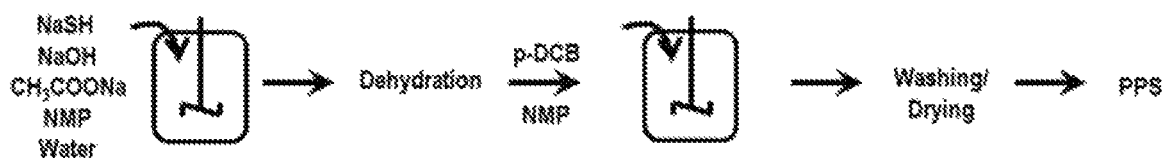

METHOD OF PREPARING POLYARYLENE SULFIDE

The present application is a National Phase entry pursuant to 35 U.S.C. § 371 or International Application No. PCT/KR2018/010862 filed on Sep. 14, 2018, and claims priority to and the benefit of Korean Patent Application No. 10-2017-0121475 filed on Sep. 20, 2017 and Korean Patent Application No. 10-2018-0108349 filed on Sep. 11, 2018, which are hereby incorporated by reference in their entireties into this application.

FIELD

The present invention relates to a method of preparing a polyarylene sulfide with a high yield, in which the polyarylene sulfide may have physical properties equivalent to or better than those of the existing method, and of which its main by-product (NaCl) may be recycled.

BACKGROUND

Polyarylene sulfide (PAS), represented by polyphenylene sulfide (PPS), is widely used in automobiles, electrical and electronic products, and machinery as a substitute for metals, and particularly for die casted metals such as aluminum or zinc, due to its excellent strength, heat resistance, flame retardancy, and processability. In particular, PPS resin is advantageous for use as a compound by kneading with a filler such as a glass fiber or a reinforcing agent, because of its good fluidity.

Generally, PAS is prepared by performing a polymerization reaction of a sulfur source and a dihalogenated aromatic compound under polymerization conditions in the presence of a polar organic compound such as N-methyl pyrrolidone (NMP), and optionally, by further using a molecular weight modifier such as alkali metal salts. A reaction product resulting from the polymerization reaction includes an aqueous phase and an organic phase, and the resulting PAS is dissolved mainly in the organic phase. Therefore, a process of separating the produced PAS is additionally performed, in which a method of precipitating PAS by cooling the reaction product is mainly used.

In this regard, a sulfur source is used for the polymerization of polyphenylene sulfide (PPS), and as the sulfur source, $Na_2S$ produced from NaHS and NaOH is used to perform PPS polymerization. In this process, after the reaction of NaHS and NaOH, Na binds to Cl of p-DCB (paradichlorobenzene) to produce a large amount of NaCl as a by-product. However, a large amount of NaCl has caused corrosion problems in a reactor, and a method of treating excess NaCl contained in the reactor has also been problematic.

SUMMARY

To solve the above problems, an object of the present invention is to provide a method of preparing a polyarylene sulfide, wherein an aqueous alkali metal salt produced as a polymerization by-product is recycled as a reaction additive during preparation of a sulfur source to reduce production costs, and to prepare polyarylene sulfide having physical properties equivalent to or better than those of the existing method, and showing a high yield. According to one embodiment of the present invention, a method of preparing a polyarylene sulfide is provided, the method including:

a first step of preparing a sulfur source containing an alkali metal sulfide and a mixed solvent of water and an amide-based compound by dehydrating a product resulting from reaction of an alkali metal hydrosulfide, an alkali metal hydroxide, and an alkali metal salt in a mixed solvent of water and the amide-based compound in the presence of an alkali metal organic acid salt; and a second step of polymerizing the polyarylene sulfide by adding a dihalogenated aromatic compound and an amide-based compound to a reactor containing the sulfur source, wherein the alkali metal salt includes sodium chloride, potassium chloride, rubidium chloride, or cesium chloride.

Effect of the Invention

In the present invention, in order to reduce use of an alkali metal hydroxide such as NaOH during preparation of a sulfur source which is used in the polymerization of a polyarylene sulfide, an alkali metal salt such as NaCl which is produced as a by-product of the polyarylene sulfide polymerization is introduced during the preparation process of the sulfur source, thereby producing polyarylene sulfide having thermal properties equivalent to or greater than those of the existing method. Further, in the present invention, since the main polymerization by-product (NaCl) is not discarded but is recycled to the preparation process of the sulfur source, economic advantages as well as a high yield may be achieved, as compared to the existing processes.

BRIEF DESCRIPTION OF THE DRAWINGS

FIG. 1 is a schematic illustration of a preparation process of a polyarylene sulfide of Example 1 of the present invention, and FIG. 2 is a schematic illustration of a preparation process of a polyarylene sulfide of Comparative Example 1.

DETAILED DESCRIPTION

Hereinafter, the present invention will be described in more detail. The present invention may be variously modified and have various forms, and specific examples are exemplified and explained in detail below. However, this is not intended to limit the present invention to the specific embodiments, and it must be understood that the present invention includes all modifications, equivalents, or replacements included in the spirit and technical scope of the present invention.

It will be further understood that the term "including", when used in this specification, specifies the presence of stated features, regions, integers, steps, operations, elements, and/or components, but does not preclude the presence or addition of other features, regions, integers, steps, operations, elements, and/or components.

Hereinafter, a method of preparing a polyarylene sulfide according to specific embodiments of the present invention, a polyarylene sulfide prepared by the method, and a molded article including the polyarylene sulfide will be described.

Generally, after polymerization of a polyarylene sulfide such as a polyphenylene sulfide, a large amount of alkali metal salts such as NaCl are produced as by-products, which cause corrosion problems in reactors. In addition, a method of treating excess alkali metal salts has been problematic.

Accordingly, in the present invention, during preparation of the polyarylene sulfide by a polymerization reaction of a sulfur source and a dihalogenated aromatic compound in a mixed solvent of water and an amide-based compound, the main by-product is used in the step of preparing the sulfur source. Therefore, the present invention provides a method of easily preparing the polyarylene sulfide, wherein use of an alkali metal hydroxide among starting materials for the preparation of the sulfur source is relatively reduced, and thermal properties of the final polymer product are equivalent to or better than those of the existing method. Further, since the method of preparing the polyarylene sulfide of the present invention utilizes the main by-product, the method is economically advantageous in that the by-product may be economically recycled without additional costs required for the treatment of the by-product. In particular, the method of preparing the polyarylene sulfide of the present invention may exhibit an improved yield to increase the amount of the final product produced.

Specifically, according to one embodiment of the present invention, a method of preparing a polyarylene sulfide is provided, the method including:

a first step of preparing a sulfur source containing an alkali metal sulfide, and a mixed solvent of water and an amide-based compound by dehydrating a product resulting from reaction of an alkali metal hydrosulfide, an alkali metal hydroxide, and an alkali metal salt in a mixed solvent of water and the amide-based compound in the presence of an alkali metal organic acid salt; and a second step of polymerizing the polyarylene sulfide by adding a dihalogenated aromatic compound and an amide-based compound to a reactor containing the sulfur source, wherein the alkali metal salt includes sodium chloride, potassium chloride, rubidium chloride, or cesium chloride.

Hereinafter, the present invention will be described in more detail for better understanding.

Each step of the method of preparing the polyarylene sulfide according to one embodiment of the present invention will be described below.

The above-described first step is a step of preparing the sulfur source.

The sulfur source is prepared by dehydrating a product resulting from reaction of an alkali metal hydrosulfide, an alkali metal hydroxide, and an alkali metal salt, in a mixed solvent of water and an amide-based compound. Therefore, the sulfur source may include the mixed solvent of remaining water (not dehydrated) and the amide-based compound, together with the alkali metal sulfide which is produced by the reaction of the alkali metal hydrosulfide and the alkali metal hydroxide.

In this regard, the present invention is characterized in that the alkali metal salt, such as NaCl, which is produced as a by-product after polymerization of the polyarylene sulfide is recycled in order to reduce use of the alkali metal hydroxide such as NaOH during the preparation of the sulfur source.

According to the present invention, partial replacement of NaOH by NaCl may reduce pH inside the reactor which is strongly basic during the dehydration reaction, leading to an increase in the yield. Further, during the polymerization of polyarylene sulfide, phase separation occurs into an aqueous layer and an amide-based compound layer (NMP). When the alkali metal salt (NaCl) which is the polymerization by-product is used as a reaction additive, a larger amount of water exists in the aqueous layer. Therefore, the water content in the amide-based compound layer (NMP layer) may be reduced to improve the polymerization reaction of the second step. Accordingly, in the present invention, the sulfur source, the dihalogenated aromatic compound, and the amide-based compound may be continuously used to prepare the polyarylene sulfide through polymerization in a high yield, as compared to the existing method.

Further, by recycling the alkali metal salt, the present invention may prevent corrosion of the reactor which is used in the polymerization of polyarylene sulfide, and may relatively reduce the amount of the alkali metal hydroxide used in the preparation of the sulfur source. The present invention may also reduce waste disposal costs.

Preferably, in the second step, the alkali metal salt is produced as a by-product of the polymerization reaction, and the alkali metal salt may be recovered and supplied as the alkali metal salt of the first step. In other words, the reactor of the first step may include an alkali metal hydrosulfide and an alkali metal hydroxide, and may also include the alkali metal salt to allow the reaction.

In this regard, the method of preparing the polyarylene sulfide of the present invention may be a continuous process, and in the process of introducing the alkali metal salt, the alkali metal salt may be a polymerization by-product obtained after preparation of the polyarylene sulfide.

Specifically, the alkali metal salt is a major by-product produced after reacting the sulfur source and the dihalogenated aromatic compound during the polymerization of the polyarylene sulfide, and the alkali metal salt may be a halogenated alkali metal salt. Preferably, the alkali metal salt may include sodium chloride, potassium chloride, rubidium chloride, or cesium chloride, and more preferably, sodium chloride.

The alkali metal salt may be used in an amount of 0.1 to 10 equivalents, based on 1 equivalent of the sulfur source. Preferably, the alkali metal salt may be used in an amount of 0.15 to 1 equivalent or 0.2 to 0.5 equivalents, based on 1 equivalent of the sulfur source. When the content of the alkali metal salt is 0.1 equivalents or less, there is a problem in that the above effect may be reduced. When the content of the alkali metal salt is more than 10 equivalents, there is a problem in that salt exceeding the solubility may remain. Meanwhile, the alkali metal sulfide may be determined according to the kind of the alkali metal hydrosulfide used in the reaction, and specific examples thereof may include lithium sulfide, sodium sulfide, potassium sulfide, rubidium sulfide, cesium sulfide, etc. Among them, any one or a mixture of two or more thereof may be included.

Specific examples of the alkali metal hydrosulfide which is applicable during preparation of the sulfur source by reaction of the alkali metal hydrosulfide and the alkali metal hydroxide may include lithium hydrosulfide, sodium hydrosulfide, potassium hydrosulfide, rubidium hydrosulfide, cesium hydrosulfide, etc. Among them, any one or a mixture of two or more thereof may be used. Anhydrides or hydrates thereof may also be used.

Further, specific examples of the alkali metal hydroxide may include lithium hydroxide, sodium hydroxide, potassium hydroxide, rubidium hydroxide, cesium hydroxide, etc. Among them, any one or a mixture of two or more thereof may be used. The alkali metal hydroxide may be used in an amount of 0.90 to 2.0 equivalents, specifically, 1.0 to 1.5 equivalents, and more specifically, 1.0 to 1.1 equivalents, based on 1 equivalent of the alkali metal hydrosulfide.

Meanwhile, as used herein, the term "equivalent" means a molar equivalent (eq/mol).

Further, during preparation of the sulfur source by reaction of the alkali metal hydrosulfide and the alkali metal hydroxide, an alkali metal organic acid salt capable of facilitating the polymerization reaction to increase a polymerization degree of the polyarylene sulfide in a short time may be introduced as a polymerization agent. Specific examples of the alkali metal organic acid salt may include lithium acetate, sodium acetate, etc. Among them, any one or a mixture of two or more thereof may be used. The alkali metal organic acid salt may be used in an amount of 0.01 to 1.0 equivalent, specifically, 0.01 to 0.8 equivalents, and more specifically, 0.05 to 0.5 equivalents, based on 1 equivalent of the alkali metal hydrosulfide.

The reaction of the alkali metal hydrosulfide and the alkali metal hydroxide may be performed in a mixed solvent of water and an amide-based compound. In this regard, specific examples of the amide-based compound may include amide compounds such as N,N-dimethylformamide, N,N-dimethylacetamide, etc.; pyrrolidone compounds such as N-methyl-2-pyrrolidone (NMP), N-cyclohexyl-2-pyrrolidone, etc.; caprolactam compounds such as N-methyl-ε-caprolactam, etc.; imidazolidinone compounds such as 1,3-dialkyl-2-imidazolidinone, etc.; urea compounds such as tetramethyl urea, etc.; phosphoric acid amide compounds such as hexamethylphosphoric acid triamide, etc. Among them, any one or a mixture of two or more thereof may be used.

The amide-based compound may more specifically be N-methyl-2-pyrrolidone (NMP) in view of the reaction efficiency and the cosolvent effect as a polymerization solvent for the polymerization of the polyarylene sulfide.

Further, water may be used in an amount of 1 to 8 equivalents, specifically, 1.5 to 5 equivalents, and more specifically, 2.5 to 4.5 equivalents, based on 1 equivalent of the amide-based compound.

As a result of the reaction of the alkali metal hydrosulfide, the alkali metal hydroxide, and the alkali metal salt, the alkali metal sulfide is precipitated in a solid phase in the mixed solvent of water and the amide-based compound, and unreacted alkali metal hydrosulfide may remain in the reaction system. Therefore, when the sulfur source prepared by reacting the alkali metal hydrosulfide and the alkali metal hydroxide is used as a sulfur source in the preparation of the polyarylene sulfide according to the present invention, a molar ratio of the sulfur source means a total molar ratio of the precipitated alkali metal sulfide resulting from the reaction and the unreacted alkali metal hydrosulfide.

Further, an alkali metal salt may be included as a by-product resulting from the reaction of the first step, and the alkali metal salt may be recovered and continuously used in the preparation of the sulfur source.

Subsequently, in order to remove the solvent such as water in the reaction product including the alkali metal sulfide produced from the above reaction, a dehydration process may be performed.

During the dehydration process, part of the amide-based compound may be discharged, together with water, and part of sulfur contained in the sulfur source may react with water by heat during the dehydration process to be volatilized as a hydrogen sulfide gas. At this time, alkali metal hydroxide is produced at the same mole as the hydrogen sulfide.

The dehydration process may be performed according to a method that is well known in the art, and thus conditions thereof are not particularly restricted. Preferably, the dehydration process may be performed in the temperature range of 130° C. to 205° C. under stirring at a speed of 100 rpm to 500 rpm. More specifically, the dehydration process may be performed in the temperature range of 175° C. to 200° C. under stirring at a speed of 100 rpm to 300 rpm.

During the dehydration process, sulfur included in the sulfur source reacts with water to produce hydrogen sulfide and alkali metal hydroxide, and the produced hydrogen sulfide is volatilized. Thus, the amount of sulfur in the sulfur source remaining in the system after the dehydration process may be reduced by the hydrogen sulfide which is volatilized out of the system. For example, when a sulfur source containing the alkali metal hydrosulfide as a main component is used, the amount of sulfur that remains in the system after the dehydration process is equal to the value obtained by subtracting the molar amount of hydrogen sulfide that is volatilized out of the system from the molar amount of sulfur in the sulfur source that is introduced. Therefore, it is necessary to quantify the amount of available sulfur contained in the sulfur source that remains in the system after the dehydration process from the amount of hydrogen sulfide that is volatilized out of the system. The dehydration process may be performed until a molar ratio of water with respect to 1 mole of the available sulfur becomes specifically 1 to 5, more specifically, 1.5 to 4, and much more specifically 2.0 to 3.5. When the amount of water in the sulfur source is excessively reduced by the dehydration process, water may be added prior to the polymerization process, thereby controlling the amount of water.

Accordingly, the sulfur source prepared by the above-described reaction of the alkali metal hydrosulfide and the alkali metal hydroxide and the dehydration may include the mixed solvent of water and the amide-based compound, together with the alkali metal sulfide, and the water may be included in a molar ratio of 2.5 to 3.5 with respect to 1 mole of the sulfur included in the sulfur source. Further, the sulfur source may further include an alkali metal hydroxide produced by the reaction of sulfur and water.

Meanwhile, according to one embodiment of the present invention, the second step is a step of preparing the polyarylene sulfide by polymerizing the sulfur source and the dihalogenated aromatic compound.

The dihalogenated aromatic compound applicable to the preparation of the polyarylene sulfide is a compound in which two hydrogens in the aromatic ring are substituted with halogen atoms, and specific examples thereof may include o-dihalobenzene, m-dihalobenzene, p-dihalobenzene, dihalotoluene, dihalonaphthalene, dihalobiphenyl, dihalobenzoic acid, dihalodiphenyl ether, dihalodiphenylsulfone, dihalodiphenyl sulfoxide, dihalodiphenyl ketone, etc. Among them, any one or a mixture of two or more thereof may be used. In the dihalogenated aromatic compound, the halogen atom may be fluorine, chlorine, bromine, or iodine. Among them, p-dichlorobenzene (p-DCB) may be used in view of the reactivity and the effect of reducing side-reactions in the preparation of polyarylene sulfide.

The dihalogenated aromatic compound may be introduced in an amount of 0.8 to 1.2 equivalents. When the dihalogenated aromatic compound is introduced in the above range, a polyarylene sulfide having excellent physical properties may be prepared without concerns about a decrease of a melting point of the prepared polyarylene sulfide and an increase of the chlorine content in the polyarylene sulfide. More specifically, the dihalogenated aromatic compound may be added in an amount of 0.8 to 1.1 equivalents, in view of the improvement effect by controlling the added amounts of the sulfur source and the dihalogenated aromatic compound.

Further, prior to the second step, the method may further include the step of decreasing the temperature of the reactor containing the sulfur source to a temperature of 150° C. to 200° C. in order to prevent vaporization of the dihalogenated aromatic compound.

Further, the polymerization reaction of the sulfur source and the dihalogenated aromatic compound may be performed in a solvent of an amide-based compound which is an aprotic polar solvent that is stable to alkalis at high temperatures.

Specific examples of the amide-based compound are the same as described above. Among the exemplified compounds, the amide-based compound may be more specifically a pyrrolidone compound such as N-methyl-2-pyrrolidone (NMP), N-cyclohexyl-2-pyrrolidone, etc., in view of reaction efficiency.

The amide-based compound in the sulfur source of the first step may serve as a cosolvent, and thus the amide-based compound may be added to the second step in such an amount that a molar ratio of water ($H_2O$) with respect to the amide-based compound present in the polymerization system (a molar ratio of water/amide-based compound) becomes 0.85 or more.

During the polymerization reaction, other additives such as a molecular weight modifier, a crosslinking agent, etc. for controlling the polymerization reaction or the molecular weight may be further added in an amount within a range that does not deteriorate the physical properties and production yield of the final polyarylene sulfide.

The polymerization reaction of the sulfur source and the dihalogenated aromatic compound may be performed at 200° C. to 300° C., or may be performed in a multistage manner by varying the temperature within the above-described temperature range. Specifically, a primary polymerization reaction may be performed at 200° C. or higher to lower than 250° C., and then a secondary polymerization reaction may be performed at a temperature higher than the temperature of the primary polymerization, specifically, at 250° C. to 300° C.

A reaction product resulting from the polymerization reaction includes an aqueous phase and an organic phase, and at this time, polyarylene sulfide which is the polymerization product is dissolved and included in the organic phase. Therefore, a process of precipitating and separating the produced polyarylene sulfide may be optionally performed.

Specifically, precipitation of the polyarylene sulfide may be performed by adding, to the reaction mixture, water in an amount of 3 to 5 equivalents with respect to 1 equivalent of sulfur, followed by cooling. When water is added within the above range, polyarylene sulfide may be precipitated with excellent efficiency.

Thereafter, the precipitated polyarylene sulfide may be optionally subjected to washing, filtering, and drying processes according to common methods.

According to the above-described method of preparing the polyarylene sulfide according to one embodiment of the present invention, it is possible to easily prepare a polyarylene sulfide showing an excellent yield while having thermal properties equivalent to or better than those of the existing method.

Particularly, in the present invention, the alkali metal salt which is a by-product resulting from polymerization of the polyarylene sulfide is recovered, and is not discarded but is recycled in the dehydration reaction for the preparation of the sulfur source, thereby preparing the polyarylene sulfide showing strength, heat resistance, flame retardancy, and processability equivalent to or better than those of the existing method, with a high yield.

Specifically, the polyarylene sulfide prepared by the preparation method may be produced in a yield of 80% or more, and more specifically, 83% or more, and may have a melting temperature (Tm) of 270° C. to 300° C. and a crystallization temperature (Tc) of 180° C. to 250° C.

Further, the polyarylene sulfide may have a weight average molecular weight (Mw) of more than 10,000 g/mol and 30,000 g/mol or less.

The polyarylene sulfide thus prepared may have excellent fluidity to exhibit improved miscibility with a filler or a reinforcing agent, and as a result, may be usefully applied to automobiles, electrical and electronic products, and machinery as a substitute for metals, in particular, as a reflector or a base plate for a vehicle lamp which is required to have excellent mechanical properties.

EXAMPLES

Hereinafter, the actions and effects of the present invention will be described in more detail with reference to the specific examples. However, these are for illustrative purposes only, and the scope of the present invention is not intended to be limited thereby.

Example 1

A polyphenylene sulfide was prepared according to the content range of Table 1 below.

To prepare a PPS polymer, 1.01 equivalents of 70% sodium hydrosulfide (NaHS) and 0.86 equivalent of sodium hydroxide (NaOH) were mixed in a reactor to prepare sodium sulfide ($Na_2S$) according to a method shown in FIG. 1. In this regard, 0.44 equivalents of sodium acetate powder, 1.65 equivalents of N-methyl-2-pyrrolidone (NMP), 4.92 equivalents of deionized water (DI water), and 0.2 equivalents of NaCl (a by-product of the polymerization) were added to the reactor to be allowed to react.

The reactor was heated at 185° C. for 1 hour and 40 minutes while undergoing stirring at 150 rpm for dehydration. Thereafter, the temperature of the reactor was decreased to 165° C., and 1.00 equivalent of para-dichlorobenzene (p-DCB) and 1.35 equivalents of NMP were added to the reactor. Thereafter, the reaction mixture was reacted for 2 hours by heating at 230° C., and then further reacted for 2 hours by heating at 250° C.

After completion of the reaction, 3 equivalents of distilled water with respect to 1 equivalent of sulfur was added to the reactor, and stirred for 5 minutes to recover the resulting product, a PPS polymer. This resulting product was repeatedly washed with distilled water and NMP until pH 7.

Subsequently, the washed product was filtered and dried to recover a polyphenylene sulfide.

Example 2

A polyphenylene sulfide was prepared according to the content range of Table 1 below.

To prepare a PPS polymer, 1.01 equivalents of 70% sodium hydrosulfide (NaHS) and 0.86 equivalents of sodium hydroxide (NaOH) were mixed in a reactor to prepare sodium sulfide ($Na_2S$) according to a method shown in FIG. 1. In this regard, 0.2 equivalents of sodium acetate powder, 1.65 equivalents of N-methyl-2-pyrrolidone (NMP), 4.92 equivalents of deionized water (DI water), and 0.2 equivalents of NaCl (a by-product of the polymerization) were added to the reactor to be allowed to react. The reactor was heated at 205° C. for 1 hour and 40 minutes while undergoing stirring at 150 rpm for dehydration. Thereafter, the temperature of the reactor was decreased to 175° C., and 1.00 equivalent of para-dichlorobenzene (p-DCB) and 1.35 equivalents of NMP were added to the reactor. Thereafter, the reaction mixture was reacted for 2 hours by heating at 230° C., and then further reacted for 2 hours by heating at 255° C.

After completion of the reaction, 3 equivalents of distilled water with respect to 1 equivalent of sulfur was added to the reactor, and stirred for 5 minutes to recover the resulting product, a PPS polymer. This resulting product was repeatedly washed with distilled water and NMP until pH 7.

Subsequently, the washed product was filtered and dried to recover a polyphenylene sulfide (yield: 84.44%).

Comparative Example 1

A polyphenylene sulfide was prepared according to the content range of Table 1 below.

To prepare a PPS polymer, 1.06 equivalents of 70% sodium hydrosulfide (NaHS) and 1.06 equivalents of sodium hydroxide (NaOH) were mixed in a reactor to prepare sodium sulfide ($Na_2S$). In this regard, 0.44 equivalents of sodium acetate powder, 1.65 equivalents of N-methyl-2-pyrrolidone (NMP), and 4.72 equivalents of deionized water (DI water) were added to the reactor.

The reactor was heated at 185° C. for 1 hour and 40 minutes under stirring at 150 rpm for dehydration. Thereafter, the temperature of the reactor was decreased to 165° C., and 1.00 equivalent of para-dichlorobenzene (p-DCB) and 1.35 equivalents of NMP were added to the reactor. Thereafter, the reaction mixture was reacted for 2 hours by heating at 230° C., and then further reacted for 2 hours by heating at 250° C.

After completion of the reaction, 3 equivalents of distilled water with respect to 1 equivalent of sulfur was added to the reactor, and stirred for 5 minutes to recover the resulting product, a PPS polymer. This resulting product was repeatedly washed with distilled water and NMP until pH 7.

Subsequently, the washed product was filtered and dried to recover a polyphenylene sulfide.

Comparative Example 2

A polyphenylene sulfide was prepared according to the content range of Table 1 below.

That is, a polyphenylene sulfide was prepared in the same manner as in Comparative Example 1, except that 0.1 equivalents of LiCl were introduced and 0.33 equivalents of NaOAc was introduced during dehydration. At this time, LiCl was not produced during polymerization, and thus LiCl, not a polymerization by-product, was separately added.

TABLE 1

| Injection Recipe (equivalent ratio) | Example 1 | Example 2 | Comparative Example 1 | Comparative Example 2 |
|---|---|---|---|---|
| NaHS | 1.01 | 1.01 | 1.01 | 1.01 |
| NaOH | 0.86 | 0.86 | 1.06 | 1.06 |
| NaOAc | 0.44 | 0.2 | 0.44 | 0.33 |
| NMP (primary) | 1.65 | 1.65 | 1.65 | 1.65 |
| Water | 4.92 | 4.92 | 4.72 | 4.72 |
| Alkali metal salt | NaCl 0.2 | NaCl 0.2 | — | LiCl 0.1 |
| p-DCB | 1.00 | 1.00 | 1.00 | 1.00 |
| NMP (secondary) | 1.35 | 1.35 | 1.35 | 1.35 |

Experimental Example 1

Physical properties of the polyphenylene sulfides prepared in Example 1 and Comparative Examples 1 and 2 were measured by the following methods, and the results are shown in Table 2 below.

(1) Yield: The weight of the recovered polyphenylene sulfide was measured using an electronic scale.

(2) Melting temperature (Tm): The melting temperature was measured using Differential Scanning calorimetry (DSC).

(3) Crystallization temperature (Tc): The crystallization temperature was measured using DSC.

TABLE 2

| | Example 1 | Comparative Example 1 | Comparative Example 2 |
|---|---|---|---|
| Yield (%) | 86.07 | 75.77 | 64.72 |
| Tm (° C.) | 281.30 | 281.18 | 280.29 |
| Tc (° C.) | 232.93 | 216.04 | 219.27 |

As shown in Table 2, when NaCl was introduced as in Example 1, the yield was further improved, as compared with the general existing polymerization method as in Comparative Example 1. Further, Example 1 showed an excellent polymerization yield, as compared with Comparative Example 2 in which LiCl was used. Particularly, in Comparative Example 2, although an alkali metal salt was introduced, it is not a product resulting from the polymerization, and its content range was lower than that of the present invention, and thus the polymerization yield was very low.

In contrast, the melting temperature and the crystallization temperature of Example 1 of the present invention were equivalent to or better than those of Comparative Examples 1 and 2, indicating that a polymer having thermal properties similar to those of the existing method may be easily prepared.

The invention claimed is:

1. A method of preparing a polyarylene sulfide, the method comprising:
a first step of preparing a sulfur source including an alkali metal sulfide and a mixed solvent of water and an amide-based compound by dehydrating a product resulting from reaction of an alkali metal hydrosulfide, an alkali metal hydroxide, and an alkali metal salt in a mixed solvent of water and the amide-based compound in the presence of an alkali metal organic acid salt; and
a second step of polymerizing the polyarylene sulfide by adding a dihalogenated aromatic compound and an amide-based compound to a reactor containing the sulfur source,
wherein the alkali metal salt comprises sodium chloride, and wherein an alkali metal salt is produced as a polymerization by-product after the polymerization in the second step, and the alkali metal salt is recovered and recycled and added as the alkali metal salt of the first step.

2. The method of claim 1, wherein the alkali metal salt is added in an amount of 0.1 to 10 equivalents with respect to 1 equivalent of the sulfur source.

3. The method of claim 1, wherein water of the first step is added in an amount of 1 to 8 equivalents with respect to 1 equivalent of the amide-based compound.

4. The method of claim 1, wherein during the reaction of the alkali metal hydrosulfide and the alkali metal hydroxide in the first step, an alkali metal organic acid salt is further introduced in an amount of 0.01 to 1.0 equivalent with respect to 1 equivalent of the alkali metal hydrosulfide.

5. The method of claim 1, wherein the alkali metal organic acid salt of the first step includes lithium acetate, sodium acetate, or a mixture thereof.

6. The method of claim 1, wherein the sulfur source of the first step includes water in a molar ratio of 2.5 to 3.5 with respect to 1 mole of sulfur.

7. The method of claim 1, wherein the dihalogenated aromatic compound includes any one or more selected from the group consisting of o-dihalobenzene, m-dihalobenzene, p-dihalobenzene, dihalotoluene, dihalonaphthalene, dihalobiphenyl, dihalobenzoic acid, dihalodiphenyl ether, dihalodiphenylsulfone, dihalodiphenyl sulfoxide, and dihalodiphenyl ketone.

8. The method of claim 1, wherein the polyarylene sulfide is produced in a yield of 80% or more, and has a melting temperature (Tm) of 270° C. to 300° C. and a crystallization temperature (Tc) of 180° C. to 250° C.

9. The method of claim 1, further comprising the step of decreasing the temperature of the reactor containing the sulfur source at a temperature of 150° C. to 200° C., prior to the second step.

10. The method of claim 1, further comprising the step of cooling the reaction mixture by adding water in an amount of 3 to 5 equivalents with respect to 1 mole of sulfur, after the polymerization reaction of the second step.

11. The method of claim 8, further comprising the step of washing the reaction mixture with water and an amide-based compound, and then drying the reaction mixture, after the cooling step.

* * * * *